No. 737,833. Patented September 1, 1903.

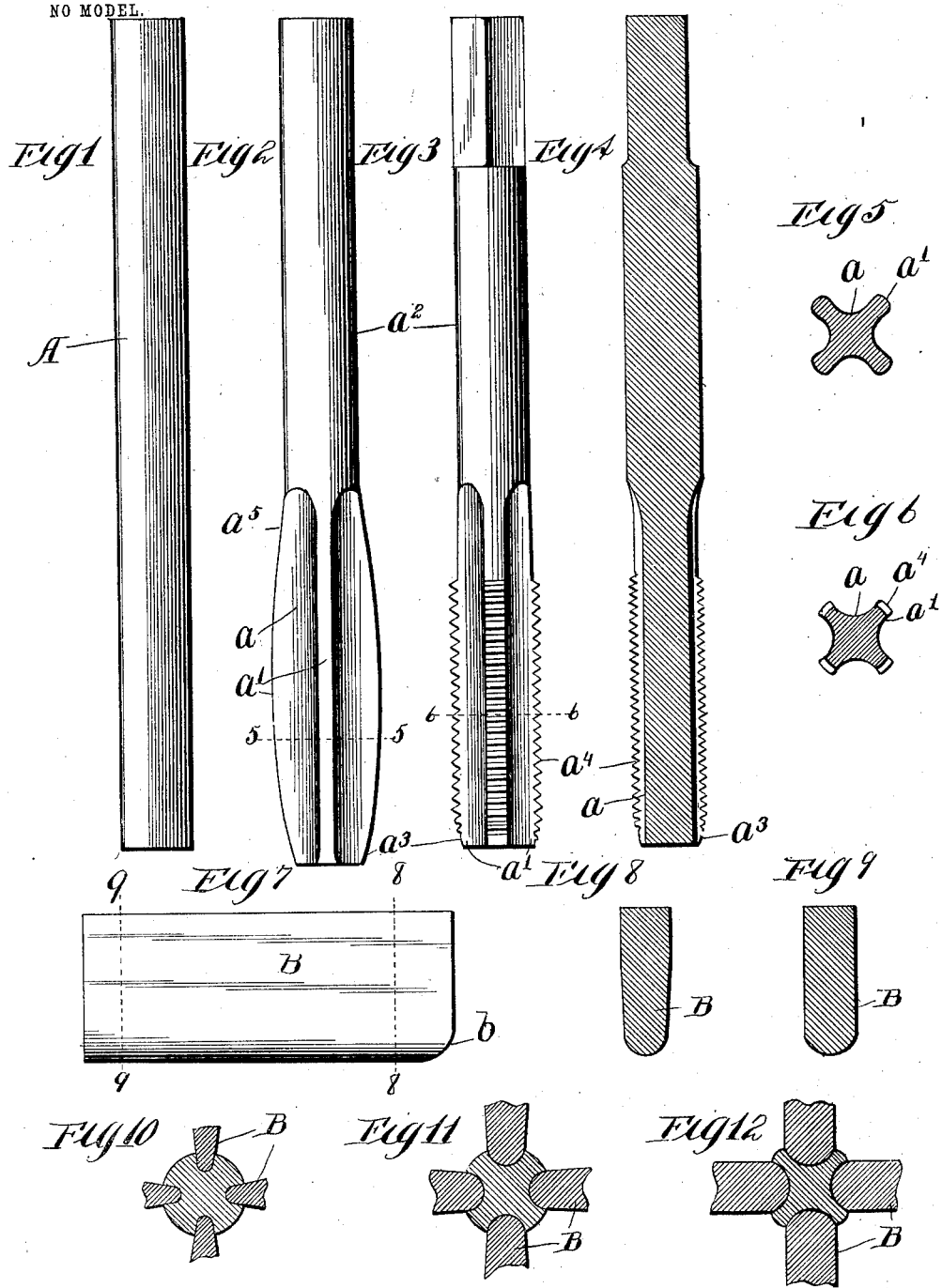

UNITED STATES PATENT OFFICE.

FREDERICK N. GARDNER, OF BELOIT, WISCONSIN, ASSIGNOR TO CHARLES H. BESLY, OF CHICAGO, ILLINOIS.

PROCESS OF MAKING TAP-BLANKS.

SPECIFICATION forming part of Letters Patent No. 737,833, dated September 1, 1903.

Application filed December 19, 1900. Serial No. 40,379. (No specimens.)

*To all whom it may concern:*

Be it known that I, FREDERICK N. GARDNER, of Beloit, in the county of Rock and State of Wisconsin, have invented certain new and useful Improvements in Processes of Making Tap-Blanks; and I do hereby declare that the following is a full, clear, and exact description thereof, reference being had to the accompanying drawings, and to the letters of reference marked thereon, which form a part of this specification.

This invention relates to a novel method of manufacturing blanks for screw-taps of that class provided with a plurality of symmetrically and longitudinally disposed lands separated by a like number of clearance-grooves, said lands being adapted to be provided on their outer faces with cutting-teeth to produce the finished product. Screw-taps of this character are usually provided with four raised lands and four clearance-grooves, and it has been the common practice in manufacturing such taps to first reduce, by means of a proper cutting-tool, the rod or blank from which the tap is made to the required diameter to form the shank of the finished tap, thereafter forming a spiral V-shaped thread on the enlarged part of the blank by means of a milling-tool or otherwise, and finally cutting away the blank in the part on which said thread is formed to provide longitudinal clearance-grooves and between the grooves raised lands, the outer faces of which are provided with cutting-teeth. One of the chief objections to the method thus outlined for making screw-taps is the great waste of the metal growing out of the reduction or cutting down of the end of the blank to form the shank and the cutting away of the metal to form the clearance-grooves. As these taps are made from a fine quality of tool-steel, the method heretofore practiced is an unduly expensive one, both by reason of the quality of steel used and the amount of labor required in shaping the taps.

One of the principal objects of the present invention is to produce blanks for screw-taps of the character set forth without the wasteful use of the material from which said taps are made, and thereby diminish the cost of the finished product. A further object of the invention and looking also toward the economy in the manufacturing of said blanks is to provide a process whereby the blanks may be made with a less expenditure of time than by the processes heretofore practiced.

In manufacturing screw-taps in accordance with my novel process I proceed generally as follows: The blank is made from a rod or blank of a uniform diameter equal to that of the shank of the finished tap and about the length of said finished tap. The rod is first heated at the end thereof on which the cutting-teeth are afterward formed to bring the same to a forging heat and to make the metal so soft that it will easily flow under pressure, and said rod is thereafter subjected to the pressure of a series of radially-movable dies acting to displace laterally and radially outward the metal of the rod to form thereon a plurality of longitudinal grooves and between said grooves elevated longitudinal ribs or lands. After said grooves and elevated lands have been thus formed and the blank thereby finished said lands are cut by means of the usual milling-tool or otherwise to form cutting-teeth thereon, said teeth being spirally disposed, so as to form spiral screw-threads. Either before or after the cutting-teeth have been formed the outer end of the tool is tapered, if it be a taper or plug tap. The outer end of the shank is also given suitable angular form to enable the same to be engaged with a stock or other actuating implement. The radial inward pressure of the dies against the blank to form the clearance-grooves therein causes the metal of the blank to be shifted laterally and radially outward and to little or no extent endwise, so that the lands or ribs on which the threads are formed after the swaging of the blank has been completed extend outside the circumference of the shank, thereby giving to the cutting end of the tool the required increase of diameter over the shank thereof.

The longitudinal grooves between the lands of the tap are formed by the operation of two or more sets of dies having different widths of working faces, the set used in the initial step of the swaging process having relatively thin edges, which act along narrow longitudinal lines of the blank and form narrow initial grooves without appreciably elongating the blank and the working faces of the dies used in the succeeding steps being made of gradually-increasing widths and adapted to displace or shift the metal laterally and radially outward, so as to widen the grooves without elongation of the blank, the working faces of the last set of dies being made of proper width and shape to give the final form to the grooves. The initial set of dies are preferably pressed into the blank the full depth of the finished grooves of the tap, so that the work of the succeeding steps is only to widen the grooves. By this means I am enabled to form the grooves without appreciably elongating the blank, so that practically all of the shifting of the metal due to the swaging process is lateral, it being obvious that the initial set having narrow working faces may be forced into the blank without tendency to elongate the same and that the effect of the other dies is to widen the grooves and shift the metal of the blank radially outward or laterally rather than shift the same longitudinally.

I have illustrated in the drawings the several steps employed in the practice of my novel process to form a screw-tap of that kind known as a "plug" tap, the appearance of the blank in the several stages of the process and of the finished tap, and have also illustrated the dies by which the clearance-grooves are formed.

In said drawings, Figure 1 is a view of a plain cylindric blank or rod from which the screw-taps are made. Fig. 2 is a view of said blank after the clearance-grooves have been formed therein by the swaging process described and before the screw-threads have been cut on the lands. Fig. 3 is a side elevation of the completed tap. Fig. 4 is an axial section thereof. Figs. 5 and 6 are cross-sections on lines 5 5 and 6 6 of Figs. 2 and 3, respectively. Fig. 7 is a side elevation of one of the dies. Figs. 8 and 9 are transverse sections of said die, taken on lines 8 8 and 9 9, respectively, of Fig. 7. Figs. 10, 11, and 12 illustrate in transverse sections the different steps or stages of forming the grooves when the grooves are formed by the combined work of three different sets of dies.

As shown in the drawings, A indicates a plain cylindric blank or rod from which a tap is to be made, the diameter of said blank being equal to the diameter of the shank $A^2$ of the completed tap. B designates one of the dies by which the longitudinal clearance-grooves located between the cutting-lands are formed. Fig. 2 illustrates a blank after the dies have been applied thereto to form in the sides of the blank longitudinal grooves $a$, between which grooves are located the lands $a'$, upon the outer faces of which are formed the cutting-teeth of the completed tap. The clearance-grooves $a$ may be formed in any suitable manner—as, for instance, by the use of a machine constructed for that purpose and illustrated in a prior United States Letters Patent granted to myself and A. Benjamin Cadman on the 8th day of October, 1901, No. 684,216, said machine consisting generally of a set of radially-movable dies which have sliding engagement with a suitable head or support and are adapted to be moved radially inwardly and outwardly toward and from the blank in such manner as to effect equal and simultaneous pressure on said blank, which is placed and held centrally between said dies in proper position for contact therewith of said dies. Before the blank is subjected to the swaging operation it is heated to the proper temperature to enable the grooves or depressions to be formed therein by a single operation of the set of swaging-dies to be used thereon.

The working faces of the dies are preferably so formed as to make deeper depressions in the ends of the grooves adjacent to the shank than at the outer ends thereof, said dies for this purpose having their working faces inclined from one end thereof to the other, as plainly indicated in Fig. 7. The ends of the dies which form the inner ends of the grooves $a$ are rounded, as indicated at $b$, to make the grooves gradually shallower until they merge into the cylindric surface of the shank. Moreover, inasmuch as the outer ends of the lands $a'$ in the completed die are tapered, as indicated at $a^3$ in Figs. 3 and 4, the curvature of the outer ends of the working faces of the dies are flatter than the inner ends of said working faces, as will be clearly understood from a comparison of Figs. 8 and 9, it being obvious that less metal needs to be shifted outwardly at the outer end of the tool than in the intermediate parts of the cutting-surface thereof.

In order to prevent an appreciable elongation of the blank under the pressure of the swaging-dies, (it being desirable that the shifting of the metal due to the pressure of the swaging process be lateral and radial instead of longitudinal,) the said grooves are formed by the combined action of two or more sets of dies, the initial set of dies having comparatively narrow working faces and the working faces of the dies which follow having gradually wider faces until the last set, the working faces of which are made to correspond to the contour desired for the finished groove.

As herein shown, the clearance-grooves $a$ are formed by three separate sets of dies B, and the manner of using said dies is shown in Figs. 10, 11, and 12. A set of dies for the initial operation is shown in Fig. 10, wherein it will be seen the working faces of the die are much narrower than the completed grooves. The initial set of dies are, however, forced into the blank to a depth equal, or nearly so, to the full depth of the grooves in the completed tap. The second set of dies are shown in Fig. 11 and are provided with wider working faces than the initial set, but of less width than the final set. Said dies enter the partially-formed groove made by the initial set of dies and act as they enter said grooves to shift the metal of the blank laterally and radially outwardly. The third or final set of dies, when the swaging process is a three-stage one, is shown in Fig. 12, and the working faces thereof are made of a width to correspond to the final contour of the grooves and act to complete the grooves. By this method of forming the grooves the shifting of the metal in the swaging process is almost wholly lateral and radial, whereas if the grooves were formed at once by a single set of dies whose working faces were of the contour and size of the finished grooves it would be obvious that said dies would produce an appreciable and objectionable elongation of the blank. Moreover, if such grooves be formed at one operation greater power would be required to force the dies to their work and greater strain would be brought upon the machine for effecting the swaging.

After the grooves have been formed in the manner described the outer faces of the lands $a'$ are cut to form thereon spirally-arranged cutting-teeth $a^4$, said teeth being formed by the action of the usual milling-tool or otherwise, as found most convenient or desirable. After or before the teeth are so formed the outer ends of the lands are cut or ground away to taper the same, as shown in Figs. 3 and 4, to provide for the proper entry of the tap into the hole to be threaded. The inner ends of said lands are also preferably cut away to remove the portion $a^5$ (shown in Fig. 2) and extending from the cylindric part of the shank to the adjacent cutting-teeth, as shown in Figs. 3 and 4, said cutting-teeth terminating at or about the point where the grooves begin to grow shallow. The outer end of the shank is thereafter squared or provided with flat faces, if desired, to provide proper engagement therewith of a stock or the like. The tap is now ready for use so far as its construction is concerned. As a matter of finish, however, the bottom of the grooves $a$ will desirably be smoothed by the action of an emery-wheel or the like.

I claim as my invention—

The hot swaging process of making screw-tap blanks from cylindric rods, which consists in first applying radial pressure to the heated blank along narrow longitudinal lines to displace the metal of the blank laterally without materially elongating the same and to form deep and narrow, symmetrically-arranged, longitudinal grooves, and subsequently by lateral pressure on the sides of said grooves, further displacing the metal of the blank laterally and radially outward to widen the grooves, and bring the blank to the desired shape.

In testimony that I claim the foregoing as my invention I affix my signature, in presence of two witnesses, this 8th day of December, A. D. 1900.

FREDERICK N. GARDNER.

Witnesses:
JNO. C. ROOD,
F. S. THACKER.